(12) United States Patent  
Poon et al.

(10) Patent No.: US 11,861,534 B2  
(45) Date of Patent: Jan. 2, 2024

(54) SYSTEM, METHOD, AND COMPUTER PROGRAM FOR SCHEDULING CANDIDATE INTERVIEW

(71) Applicant: Eightfold AI Inc., Mountain View, CA (US)

(72) Inventors: Yuet Ping Poon, Mountain View, CA (US); Varun Kacholia, Mountain View, CA (US); Anthony Hahn, Mountain View, CA (US); Partha Sarathi Pati, Mountain View, CA (US); Kevin Raji Cherian, Mountain View, CA (US)

( * ) Notice: Subject to any disclaimer, the term of this patent is extended or adjusted under 35 U.S.C. 154(b) by 0 days.

(21) Appl. No.: 17/041,833

(22) PCT Filed: Dec. 30, 2019

(86) PCT No.: PCT/US2019/068926  
§ 371 (c)(1),  
(2) Date: Sep. 25, 2020

(87) PCT Pub. No.: WO2021/137848  
PCT Pub. Date: Jul. 8, 2021

(65) Prior Publication Data  
US 2021/0295238 A1 Sep. 23, 2021

(51) Int. Cl.  
*G06Q 10/0631* (2023.01)  
*G06Q 10/1053* (2023.01)

(52) U.S. Cl.  
CPC .......... *G06Q 10/063112* (2013.01); *G06Q 10/06314* (2013.01); *G06Q 10/063116* (2013.01); *G06Q 10/1053* (2013.01)

(58) Field of Classification Search  
CPC ... G06Q 10/063112; G06Q 10/063116; G06Q 10/06314; G06Q 10/1053

(Continued)

(56) References Cited

U.S. PATENT DOCUMENTS

2008/0172284 A1 7/2008 Hartmann  
2013/0096991 A1* 4/2013 Gardner ............. G06Q 30/0623  
                                                      705/7.42

(Continued)

FOREIGN PATENT DOCUMENTS

WO    WO-2016205909 A2 * 12/2016  ......... G06Q 30/0203

OTHER PUBLICATIONS

Ngongo, The Perils of Straying from Protocol: Sampling Bias and Interviewer Effects, Feb. 15, 2018, https://www.ncbi.nlm.nih.gov/pmc/articles/PMC4334207/pdf/pone.0118025.pdf, p. 1-11.*

(Continued)

*Primary Examiner* — Mehmet Yesildag  
*Assistant Examiner* — James Webb  
(74) *Attorney, Agent, or Firm* — Zhong Law LLC

(57) ABSTRACT

An intelligent scheduler system implemented by one or more computer for objectively selecting interviewers for an interview of a candidate for a job opening at an organization. The one or more computers includes a storage device and a processing device to generate a calibrated job profile, generate an enriched talent profile of the candidate, identify, based on the calibrated job profile and the enriched talent profile, an aspect of the candidate to be evaluated during the interview, execute a deep neural network comprising an input layer to receive the aspect, the enriched talent profile of the candidate, and the enriched talent profiles of the potential interviewers, and an output layer to output match scores each indicating an effective measure of a corresponding one of the potential interviewers for evaluating the aspect during the interview, and determine, based on the match scores, qualified interviewers from the potential interviewers.

19 Claims, 7 Drawing Sheets

(58) Field of Classification Search
USPC .......................................................... 705/7.14
See application file for complete search history.

(56) References Cited

U.S. PATENT DOCUMENTS

| | | | |
|---|---|---|---|
| 2018/0005190 A1* | 1/2018 | Innes | G06Q 10/0639 |
| 2019/0164107 A1* | 5/2019 | Upadhyay | G06Q 10/109 |
| 2019/0188624 A1* | 6/2019 | Pong | G06Q 10/063112 |
| 2019/0378017 A1* | 12/2019 | Kung | G06N 3/0454 |

OTHER PUBLICATIONS

Spark, Diversity and Inclusion: What's the Difference, and How Can We Ensure Both?, Mar. 2019, https://www.adp.com/spark/articles/2019/03/diversity-and-inclusion-whats-the-difference-and-how-can-we-ensure-both.aspx, p. 1-3.*

International Application No. PCT/US2019/068926, International Search Report and Written Opinion dated Mar. 31, 2020, 10 pages.

* cited by examiner

SYSTEM, METHOD, AND COMPUTER PROGRAM FOR SCHEDULING CANDIDATE INTERVIEW

The present application is the US national phase of International patent application No. PCT/US2019/068926, titled "SYSTEM, METHOD, AND COMPUTER PROGRAM FOR SCHEDULING CANDIDATE INTERVIEW", filed Dec. 30, 2019.

TECHNICAL FIELD

The present disclosure relates to technical solutions that solve practical challenges in scheduling candidate interviews, and in particular to a system, method, and storage medium including executable computer programs for scheduling candidate interviews.

BACKGROUND

An organization needs to hire employees and contractors to fulfill job openings. The hiring process may include interview of candidates by personnels associated with the organization. The interview may help evaluate and validate the skills of a candidate, obtain additional information about the candidate, introduce the organization and the job function to the candidate, and establish a mutual understanding between the organization and the candidate.

An interview coordinator may be responsible for selecting and scheduling suitable interviewers associated with the organization to conduct interviews with a candidate. The task to select interviewers and coordinate the schedules of interviewers is often time-consuming. For a large organization with a large pool of potential interviewers, the interview coordinator (e.g., a human resource manager, a technical manager, or an administrative assistant) may need to personally select the potential interviewers and contact each of them to determine who is available for which time slot given an interview schedule.

Additionally, in practice, the interview coordinator often do not possess the knowledge or tools to make the optimal selection of the interviewers from a large pool of potential interviewers of the organization. For example, in a large organization, the interview coordinator are often unaware of the best matches between the skills possessed by the candidate that need to be evaluated and the knowledge bases of the potential interviewers. The reasons for the inability to find the optimal matches can be that: (1) the interview coordinator does not know or is not fully aware of the skills of those in the pool of the potential interviewers; (2) the interview coordinator uses subjective criteria to evaluate the matches between the candidate and the potential interviewers. For example, the information made available to the interview coordinator can be unincorporated information such as, for example, internal profiles (e.g., HR database) or external profiles (e.g., social network footprints) of the potential interviewers. These unincorporated information is often prepared by authors in diverse forms to attract the attention of reader. These data points, however, commonly lack a uniform framework and are not designed for objective evaluation. Too often, the interview coordinator may select interviewers based on arbitrary factors such as the personal relationships between the coordinator and the interviewers. For example, the interview coordinator may choose an interviewer with whom the interview coordinator personally knows well rather than a more suitable but unfamiliar one.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
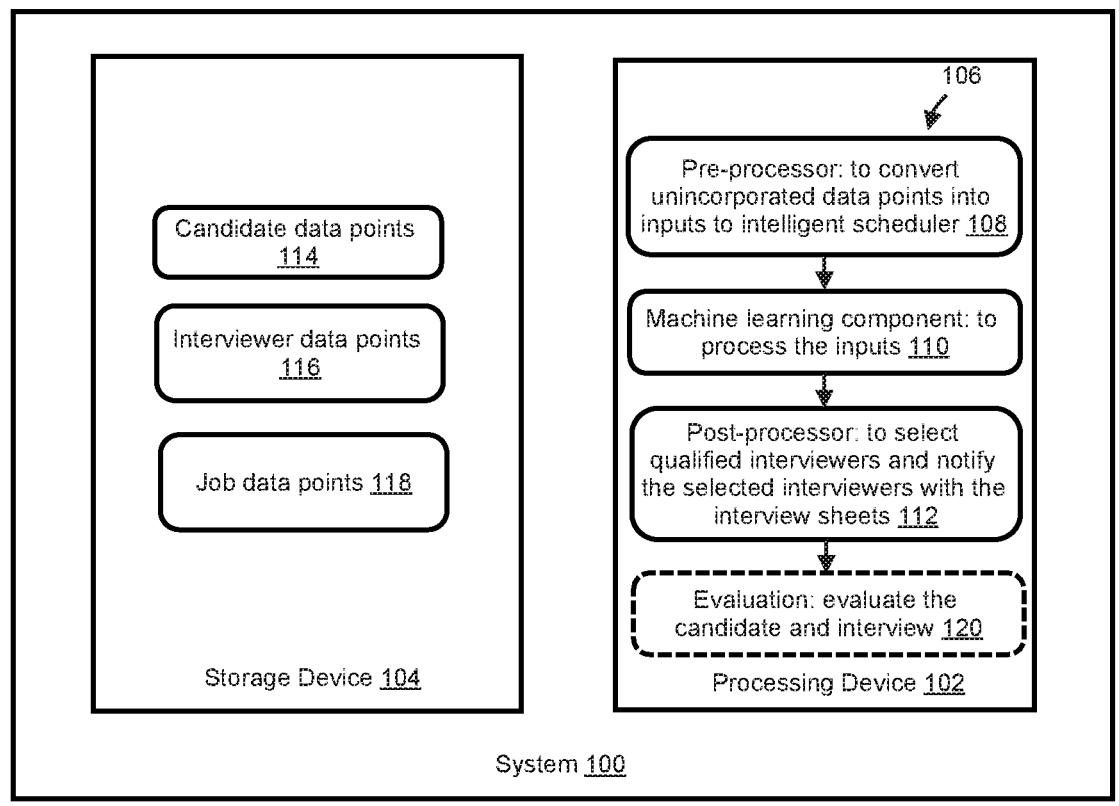
FIG. 1 illustrates a system for generating an interview schedule according to an implementation of the disclosure.

Therefore, there is a need for a technical solution including a system, method, and computer program that can automate the process to identify most effective interviewers to evaluate and validate different aspects of a job candidate in an objective and uniform manner, and a further need for scheduling a group of interviewers based on rules, where the rules may take into consideration availabilities of the potential interviewers and the predicted effectiveness of the interviewers.

Implementations of the disclosure may provide a computer system which may include a software tool (referred to as an "intelligent scheduler") implemented on a hardware processing device. The intelligent scheduler may use objective criteria to automate or facilitate the scheduling of a candidate interview with an organization, reducing or eliminating the reliance on the subjective judgement of the interview coordinator, and further saving the time for the interview coordinator used to manually arrange the interview agenda. The intelligent scheduler may take into consideration a first set of data points describing attributes of the candidate, a second set of data points describing the job opening, and a third set of data points describing a pool of potential interviewers available to the organization. The intelligent scheduler may further include a machine learning component that may had been generated using a training data according to performance criteria. The machine learning component may compute match scores of the potential interviewers with respect to an aspect to be evaluated and validated, and rank the potential interviewers according to the match scores indicating their predicted effectiveness to evaluate and validate the aspect during the interview.

In one implementation, a pre-processor of the intelligent scheduler may first convert the first set of data points describing attributes of the candidate, the second set of data points describing the job opening, and the third set of data points describing a pool of potential interviewers into data inputs that are suitable to be processed by the machine learning component. Responsive to receiving the data inputs, the processing device may execute the trained machine learning component to determine interviewers whose knowledge and skills likely match those of the candidate. In one implementation, the machine learning component may calculate a match score for each one in the pool of potential interviewers with respect to the candidate, and rank the potential interviewers according to their match scores. The intelligent scheduler may further include a post-processor to select interviewers based on the match scores for different aspects and may further generate a personalized interview sheet for each selected interviewer. The intelligent scheduler may transmit an interview invitation to the corresponding selected interviewer along with the generated interview sheet.

Compared to the manual process to arrange the candidate interview by the interview coordinator, the intelligent scheduler as implemented takes into multiple data points including those beyond the reach of or commonly considered by the interview coordinator and analyzes these data points using a machine learning model created according to objective criteria, thus resulting in the selection of more effective interviewers for the interview and achieving objective and comprehensive evaluations of the candidate. A machine learning model can generate outputs based on received inputs and the parameters. The model may be specified by parameters that may be tuned through a parameter training process. Further, the intelligent scheduler may also provide tools to reduce the workload of the interview coordinator. The tools may include a user interface for confirming the selected interviewers, presenting the interview agenda with time slots filled with the selected interviewers and their information, and generating branded notification (e.g., e-mail) to the candidate. Thus, instead of fully replacing the interview coordinator, the intelligent scheduler may produce optimal matches, measured using objective criteria, between the skill set of the interviewers and the candidate, and provide tools that may reduce the workload of the interview coordinator. To this end, implementations of the disclosure provide practical solutions that improve the process to schedule job interviews for an organization, improving the speed and quality to arrange an interview.

FIG. 1 illustrates a system 100 for generating an interview schedule according to an implementation of the disclosure. System 100 can be a standalone computer system or a networked computing resource implemented in a computing cloud. Referring to FIG. 1, system 100 may include a processing device 102 and a storage device 104 communicatively coupled to processing device 102.

Processing device 102 can be a hardware processor such as a central processing unit (CPU), a graphic processing unit (GPU), or an accelerator circuit. Processing device 102 can be a programmable device that may be programmed to implement an intelligent scheduler 106 which may include a pre-processor 108, a machine learning component 110, and a post-processor 112. The intelligent scheduler 106 may optionally include an evaluation component 120. Storage device 104 can be a hard disk or a cloud storage that may store data points used by the intelligent scheduler and the results generated by the intelligent scheduler. The data points used by the intelligent scheduler may include the candidate data points 114, the interviewer data points 116, and the job data points 118. Candidate data points 114 include data sources that contain information pertaining to the candidate. Interviewer data points 116 include data sources that contain information pertaining to the pool of potential interviewers associated with the organization. Job data points 118 include data sources that contain information pertaining to the job opening. Processing device 102 may receive and process these data point to generate an interview schedule.

In one implementation, processing device 102 may execute the intelligent scheduler including execution of pre-processor 108 that may convert these unincorporated data points into data inputs that may be processed by machine learning component 110. Processing device 102 may further execute machine learning component 110 to process the data inputs to generate lists of ranked potential interviewers, where each list is associated with one or more aspects. The machine learning component 110 may include a machine learning model that had previously been created using a training data set. During the train step, parameters of the machine learning model may be modified until the machine learning component 110 reaches certain performance criteria. The generated lists of ranked potential interviewers may include interviewers identified based on match scores as suitable to interview the candidate. The machine learning component 110 may select interviewers based on rules such as, for example, selecting interviewers whose match scores are higher than a threshold value. The machine learning component 110 may also identify alternative interviewers to substitute the selected ones in case if any of the selected ones declines the interview.

Processing device 102 may execute post-processor 112 to manage time conflicts for selected interviewers, generate personalized interview sheets, and notify the selected interviewers by sending the interview sheets. Based on the availability of interviewers and their match scores, post-processor 112 may select qualified interviewers and assign them in time slots in the interview schedule. Further, each interviewer may be identified to evaluate and validate a certain aspect of the candidate. For example, an interviewer may be assigned to evaluate and validate a programming skill (e.g., Python). To this end, post-processor 112 may provide a list of questions and answers for evaluating the programming skills on the interview sheet prepared for the interviewer, and transmit the interview sheet with the list of questions and answers to the interviewer.

The following sections describe intelligent scheduler 106 in detail. In one implementation, pre-processor 106 may be used to prepare the data inputs for machine learning component 108. Pre-processor 106 may retrieve unincorporated data points relating to the candidate, the pool of potential interviewers, and the job openings. These data points are unincorporated because they come from independent sources both internal and external to the organization. These documents may contain information that is useful for the machine learning component 108 and also information that is irrelevant to the machine learning component because these documents often contain diverse elements prepared to attract human readers' attention. Thus, pre-processor 106 may need to convert the diverse data points that may be suitable for human readers into data inputs in formats suitable for processing by processing device 102 executing the machine learning component 106.

Figure 2:
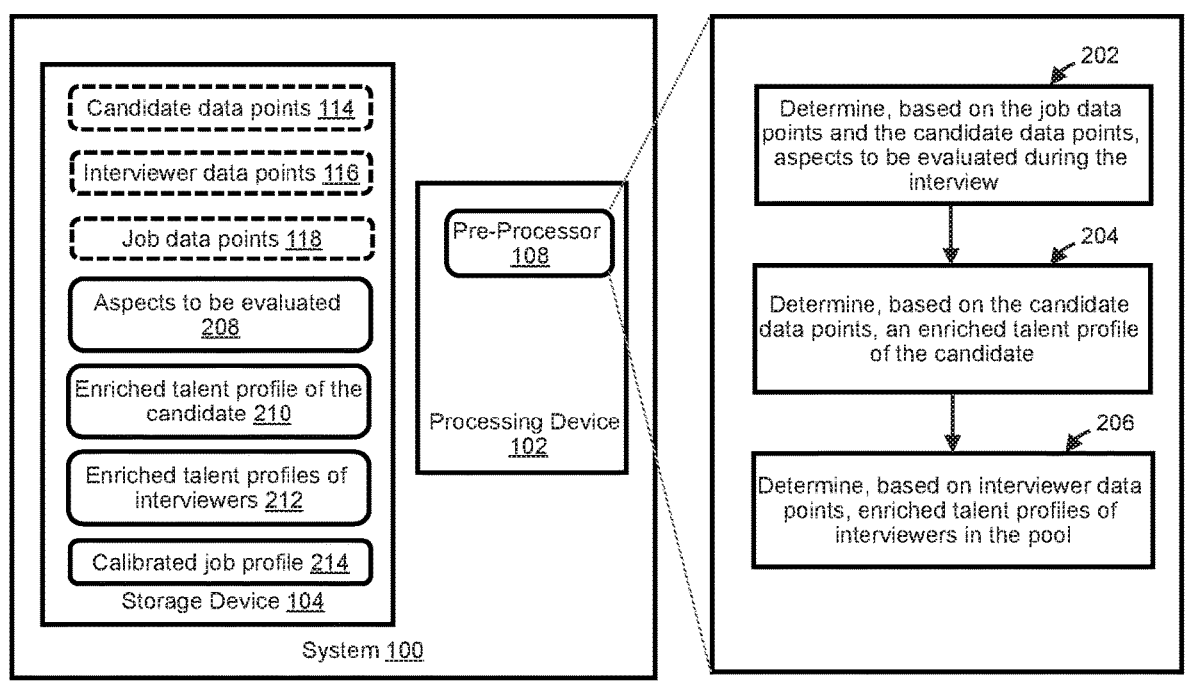
FIG. 2 illustrates a system implementing pre-processor according to an implementation of the disclosure.

In one implementation, processing device 102 may execute the pre-processor 106 to convert the candidate data points 114, the interviewer data points 116, and the job data points 118 into data inputs to data inputs to the machine learning component 118. FIG. 2 illustrates a system implementing pre-processor 116 according to an implementation of the disclosure. Referring to FIG. 2, processing device 102 may execute the pre-processor 106 to, at 202, determine, based on job data points 118 and candidate data points 114, aspects of the candidate to be evaluated 208; at 204, determine, based on the candidate data points, an enriched talent profile of the candidate 210; at 206, determine, based on interviewer data points, enriched talent profiles 212 of potential interviewers in the pool.

In one implementation, at 202, processing device 102 may determine, based on job data points 118 and candidate data points 114, aspects of the candidate to be evaluated during the interview. The aspects to be evaluated during the interview may include job skills relevant to the job as well as personal traits such as, for example, the level of interest towards the job, the level of effort, team work attitude etc. Job data points 118 may provide a job description that may include public information such as, for example, the job title; responsibilities of the job; education, training, and certifications required for the job; skills required or preferred to perform the job; prior working experience. The job data points 118 may also include additional information implicitly related to the job. The additional information may include a profile of a qualified candidate previously hired for a same or similar position within the organization or predicted based on candidates previously hired for a same or similar position within the organization. The profiles of the qualified candidates may include their resumes, supplemental data (e.g., personal web pages, social network pages, professional work products such as technical publications, open source software contributions, awards) associated with the qualified candidates, and assessed skill levels of the qualified candidates. In one implementation, job data points may provide the job description and the additional information that are retrieved from independent sources (e.g., intranet sources and Internet source). Alternatively, job data points may provide the job description and the additional information from a single source. For example, the pre-processor 108 may combine the job description and the additional information into a calibrated job profile 214 and store calibrated job profile 214 on storage device 104.

Processing device may execute pre-processor 108 to retrieve information relating to the candidate to be interviewed from candidate data points 114. The retrieved information may include a profile of the candidate to be interviewed and supplemental data relating to the candidate to be interviewed. The profile may include the candidate resume containing skills, past employments, responsibilities and duration of these employments, a training history, and an education history including schools, fields of study, grade point average (GPA), rankings, and degrees. The supplemental data may include personal web pages/blogs/video postings, social network pages (e.g., LinkedIn and or Facebook pages), professional work products (e.g., technical publications, open source software contributions), patents, professional references, awards etc. In addition to the first-order data points such as the profile and the supplemental data retrieved from different sources, processing device 102 may also receive or generate second-order information such as insights about the candidate. The insights can be predicted future job titles, predicted future employers, predicted future seniority levels, predicted future skills to acquire, and predicted tenure duration with the organization. These predictions may be calculated using a second machine learning model. In one implementation, pre-processor 108 may combine the profile of the candidate, the supplemental data of the candidate, and the second-order information to create an enriched talent profile object 210 for the candidate and store enriched talent profile 210 on storage device 104.

In one implementation, pre-processor 108 may further process the information extracted from job data points 118 and the information extracted from candidate data points 114 to generate aspects of the candidates to be evaluated and validated during the interview. As discussed above, the aspects may include job skills and personal traits. The job skills may include knowledge and experience relating to a programming language (e.g., Java, C, Python etc.), a development environment, a system design, or a circuit design. The personal traits may include the level of interest towards the job, the level of effort, team work attitude etc.

The pre-processor 108 may include a comparator that may compare the information extracted from job data points 118 and the information extracted from candidate data points 114 to generate one or more aspects for evaluation during the interview. In one implementation, the comparator can be executable program code that, when executed by processing device 102, may read the information extracted from job data points 118 and the information extracted from candidate data points 114, and identify aspects that are specified in the job description and indicated to be possessed by the candidate. In addition to the aspects that are expressly specified in the job description, pre-processor 108 may also identify relevant aspects that are not expressly specified in the job description. For example, pre-processor 108 may identify certain aspects relating to the expressly specified aspects. These related aspects can be, for example, a pre-requisite to a specified skill. Evaluation of the pre-requisite skill may be useful for validating the skill specified in the job description.

In one implementation, the comparator may perform keyword matching between the calibrated job profile 214 and the enriched talent profile 210 of the candidate. A keyword dictionary may define a list of keywords that each may match a corresponding aspect. For each aspect defined in the keyword dictionary, pre-processor 108 may determine whether the aspect is specified in the calibrated job profile 214 expressly or implicitly by relationship and whether the aspect is presented in enriched talent profile 210 of the candidate. Responsive to determining that the aspect presents both in the calibrated job profile 214 and the enriched talent profile 210 of the candidate, pre-processor 108 may designate the determined aspect as one to be evaluated during the interview. In one implementation, each keyword in the keyword dictionary corresponds to one aspect that can be evaluated. In another implementation, the keyword dictionary may include a relationship graph in which keywords are linked based on their similarities (e.g., a similarity measurements in a range of [0, 1] with zero representing no relation and one representing 100% correlation. Thus, pre-processor 108 may determine the aspect based on an approximate match among keywords.

Pre-processor 108 may further provide a graphic user interface including a view to display the calibrated job profile 214 with aspects highlighted, a view to display the enriched talent profile with aspects highlighted, and a view to display the aspects, where each of the aspects is associated with a select element for the interview coordinator to confirm whether to select the corresponding aspect. Responsive to receiving an activation of the select element, the pre-processor may store the selected aspect in storage device 104 as aspects to be evaluated 208 during the interview.

As discussed above, at 204, pre-processor 108 may further, based on the candidate data points 114, generate enriched talent profile 210 for the candidate. Further, at 206, pre-processor 108 may, based on interviewer data points 116, generate enriched talent profiles 212 of potential interviewers. The process to generate an enriched talent profile 212 for a potential interviewer may be similar to the one used to generate enriched talent profile 210 of the candidate. For each potential interviewer, pre-processor 108 may extract a profile of the potential interviewer and supplemental data of the potential interviewer from interviewer data points 116, where the profile may contain the following interviewer information: past roles and jobs, skills, employers as well as responsibilities and duration of these employments, a training history, and an education history including schools, fields of study, grade point average (GPA), rankings, and degrees, and the supplemental data may contain the following interviewer information: personal web pages/blogs/video postings, social network pages (e.g., LinkedIn and or Facebook pages), professional work products (e.g., technical publications, open source software contributions), patents, professional references, awards etc. Pre-processor 108 may then combine the profile and the supplemental data of the potential interviewer to form the enriched talent profile of the potential interviewer. In this way, pre-processor 108 may construct a collection of enriched talent profiles of all potential interviewers associated with the organization. Since the pool of potential interviewers are likely current employees that are relatively stable workforce, the enriched talent profiles of all potential interviewers may be generated in advance and stored in storage device 104.

Figure 3:
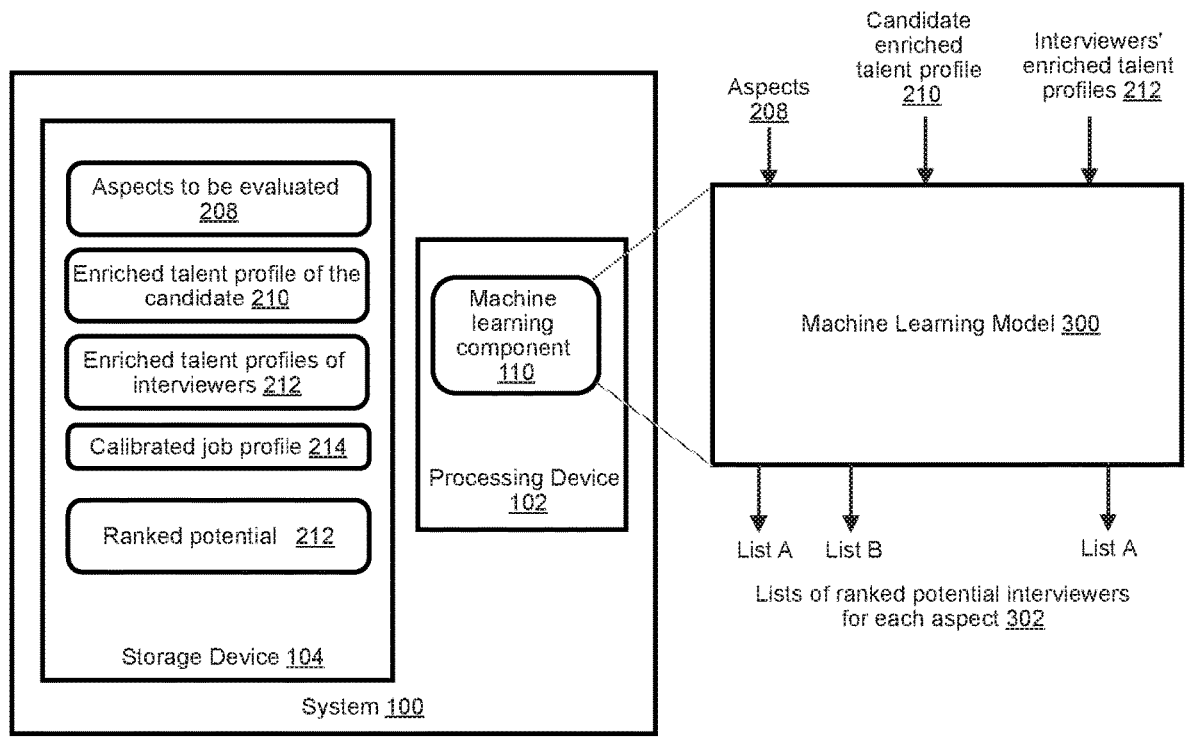
FIG. 3 illustrates a system implementing the machine learning component according to an implementation of the disclosure.

Intelligent scheduler 106 may further include machine learning component 110 to process data inputs generated by pre-processor 108. FIG. 3 illustrates a system implementing the machine learning component 110 according to an implementation of the disclosure. As shown in FIG. 3, in one implementation, machine learning component 110 may include a machine learning model 300 that receive data inputs including aspects 208 to be evaluated during the interview, candidate enriched talent profile 210, and potential interviewers' talent profiles 212 from pre-processor 108. Processing device 102 may further execute machine learning model 300 to generate lists of ranked potential interviewers 302, wherein each list is associated with a corresponding one of the aspects 208, and each list includes a number of potential interviewers identified by machine learning model 300 as suitable to evaluate the aspect associated with the list and ranked by machine learning model 300 according to calculated match scores indicating the suitability of potential interviewers for evaluating the aspect of the candidate. For example, for each one of aspects 208 determined by pre-processor 108, processing device 102 may execute machine learning model 300 to generate a corresponding list (A, B, . . . , or N) containing potential interviewers ranked according to match scores calculated by executing machine learning model 300. In one implementation, for each aspect, processing device 102 may execute machine learning model 300 to calculate a respective match score for each potential interviewer and construct the list of potential interviewers in a ranking order based on the match score values (e.g., higher ranking order for higher match score value). Thus, machine learning model 300 may, for each aspect (A, B, . . . , N), generate a corresponding list (List A, List B, . . . , List N) containing potential interviews ranked according to their match score for the aspect.

Machine learning in this disclosure refers to methods implemented on hardware processing device that uses statistical techniques and/or artificial neural networks to give computer the ability to "learn" (i.e., progressively improve performance on a specific task) from data without being explicitly programmed. The machine learning may use a parameterized model (referred to as "machine learning model") that may be deployed using supervised learning/semi-supervised learning, unsupervised learning, or reinforced learning methods. Supervised/semi-supervised learning methods may train the machine learning models using labeled training examples. To perform a task using supervised machine learning model, a computer may use examples (commonly referred to as "training data") to test the machine learning model and to adjust parameters of the machine learning model based on a performance measurement (e.g., the error rate). The process to adjust the parameters of the machine learning mode (commonly referred to as "train the machine learning model") may generate a specific model that is to perform the practical task it is trained for. After training, the computer may receive new data inputs associated with the task and calculate, based on the trained machine learning model, an estimated output for the machine learning model that predicts an outcome for the task. Each training example may include input data and the corresponding desired output data, where the data can be in a suitable form such as a vector of numerical alphanumerical symbols.

The learning process may be an iterative process. The process may include a forward propagation process to calculate an output based on the machine learning model and the input data fed into the machine learning model, and then calculate a difference between the desired output data and the calculated output data. The process may further include a backpropagation process to adjust parameters of the machine learning model based on the calculated difference. Unsupervised learning methods may find structure in data based on only the input data. Thus, unsupervised learning methods may learn about commonalities about the data from test data that are not labeled, classified, or categorized. Unsupervised learning methods may identify commonalities in a dataset and make decisions based on the presence/absence of the commonalities in the dataset. Reinforced learning methods may use agents (e.g., software agents) to react in an environment so as to maximize a reward function. The environment can be represented using a decision process. Reinforced learning methods may assume no knowledge of the exact mathematical model of the decision process and thus can be used when the exact model is difficult to determine.

In one implementation, machine learning model 300 is a deep neural network (DNN) implemented on processing device 102. A DNN may include multiple layers, in particular including an input layer for receiving data inputs, an output layer for generating outputs, and one or more hidden layers that each includes linear or non-linear computation elements (referred to as neurons) to perform the DNN computation propagated from the input layer to the output layer that may transform the data inputs to the outputs. Two adjacent layers may be connected by edges. Each of the edges may be associated with a parameter value (referred to as a synaptic weight value) that provide a scale factor to the output of a neuron in a prior layer as an input to one or more neurons in a subsequent layer.

The synaptic weight values are determined by a training process of the DNN. During the training process, synaptic weight values may be tuned to perform the specific task of selecting interviewers with respect to an aspect. The training may be carried out using training data that may include pairs of data inputs and corresponding target outputs. These pairs may have been generated and labeled based on prior interviews where interviewers evaluate and validate one or more aspects of a candidate. The prior interviews used as the training data may include positive examples where the interviewers effectively evaluate and validate one or more aspects of the candidate (e.g., either in possession of or lack of the one or more skills). The prior interviews used as the training data may optionally also include negative examples where the interviewers could not evaluate or validate any aspect of the candidate.

Figure 4:
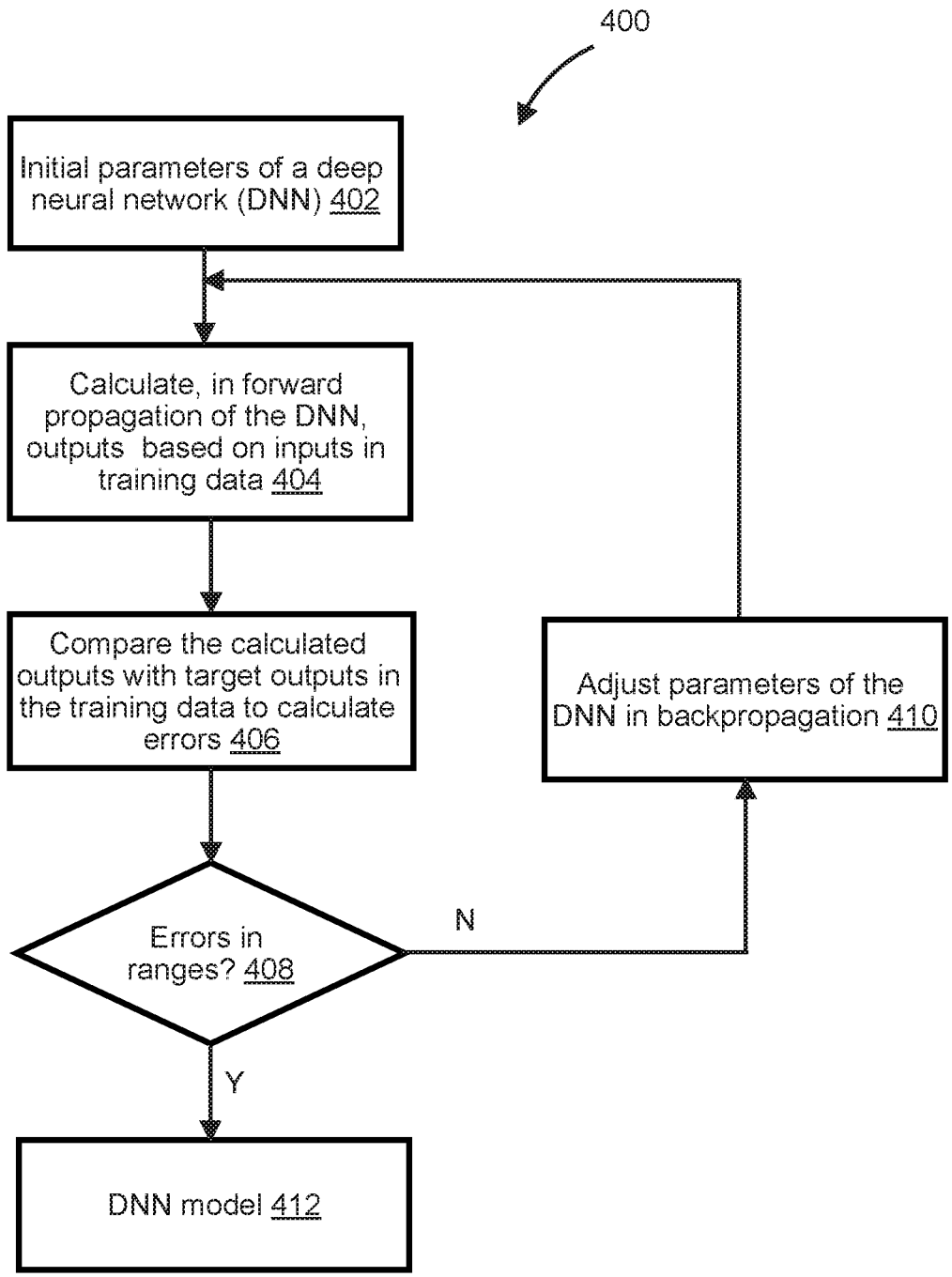
FIG. 4 illustrates a training process to train a machine learning model according to an implementation of the disclosure.

FIG. 4 illustrates a training process 400 to train a machine learning model 300 (e.g., a DNN model) according to an implementation of the disclosure. At 402, the processing device implementing the training process may assign edges with initial synaptic weight values (e.g., a constant numerical value or random values). At 404, the processing device implementing the training processing may perform a forward propagation calculation using the DNN that generates outputs based on data inputs in the training data. The data inputs in the training data may include the enriched talent profiles of previous candidates and the enriched talent profiles of previous interviewers with respect to one or more aspects (e.g., skills). The forward propagation calculation may propagate from the input layer through the hidden layers to the output layer to generate outputs. The generated outputs can be match scores indicating the effectiveness of the interviewers for evaluating and validating the one or more aspects. At 406, the processing device implementing the training process may compare the calculated outputs with the target outputs obtained by the forward propagation calculation at 404. The comparison may result in differences (referred to as errors) between the calculated outputs and the target outputs, where the outputs are match scores. At 408, the processing device implementing the training process may determine whether the errors are within target performance ranges for the DNN. Responsive to determining that the errors exceed the target performance ranges, at 410, the processing device implementing the training process may perform a backpropagation calculation that, according to pre-determined rules, adjusts the synaptic weigh values to toward reducing the errors. After adjusting the synaptic weight values, the processing device implementing the training process may repeat the forward propagation calculation and the backpropagation iteratively. Alternatively, responsive to determining that the errors are within the target performance ranges for the DNN, at 412, the processing device implementing the training process may generate the DNN model that may be used at the machine learning model 300 as shown in FIG. 3.

In one implementation, the training process 400 can be offline training, where the machine learning model is trained in advance and the parameters of the machine learning model are not further adjusted after completion of the training. In another implementation, the training process can be online training, where the parameters of the machine learning model may be further updated responsive to receiving new results during the execution of machine learning component 110 as shown in FIG. 2.

As described above in conjunction with FIGS. 3 and 4, processing device 102 executing the trained machine learning model 300 may receive candidate enriched talent profile 210 and interviewers' enriched talent profiles 212 and use trained machine learning model 300 to generate lists of ranked potential interviewers 302 with respect to one or more aspects 208. Each of the lists associated with an aspect may contain potential interviewers ranked according to their corresponding match scores indicating the calculated effectiveness of the interviewer with respect to the aspect.

Figure 5:
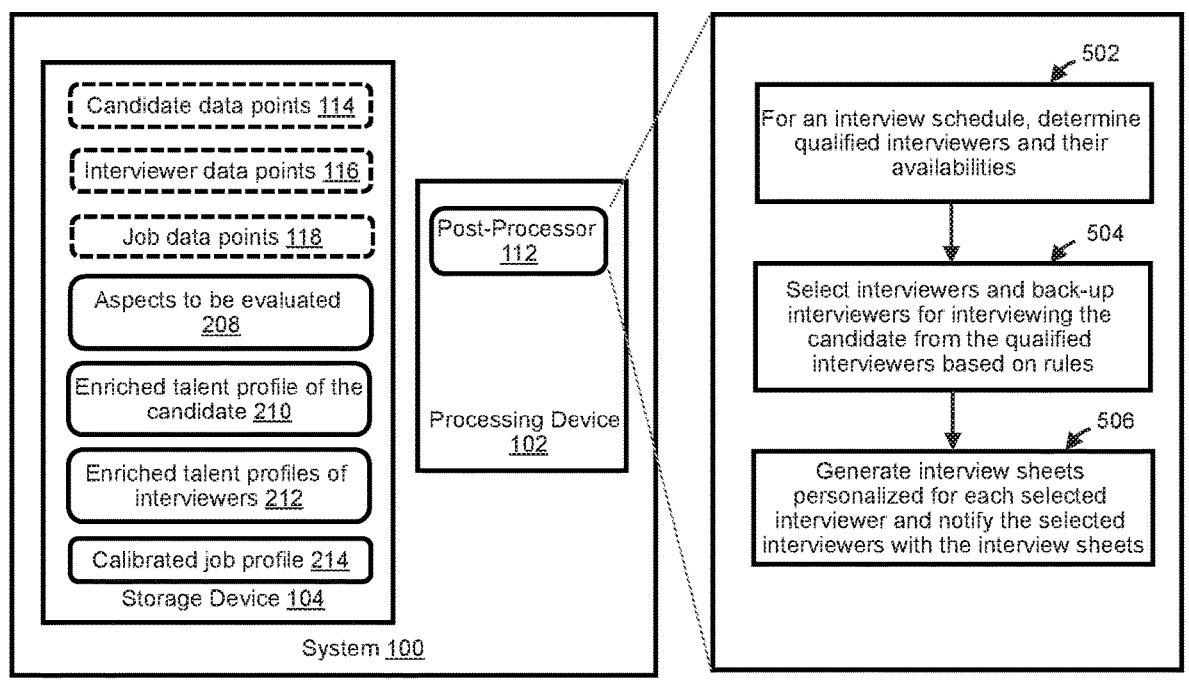
FIG. 5 illustrates a system implementing the post-processor according to an implementation of the disclosure.

Intelligent scheduler 106 may further include a post-processor 112 to select qualified interviewers for interviewing the candidate with respect to the one or more aspects. FIG. 5 illustrates a system implementing the post-processor 112 according to an implementation of the disclosure. As shown in FIG. 5, in one implementation, post processor 112 may determine qualified interviewers and their availabilities, select interviewers (and back-up interviewers) based on rules, generate interview sheet personalized for each selected interviewer and notify the selected interviewers with the corresponding interview sheets.

At 502, processing device 102 executing post-processor 112 may, for a pre-determined interview schedule, determine qualified interviewers from the pool of ranked potential interviewers identified in the lists generated by machine learning model 300. The interview schedule may have been set based on a schedule of the candidate. For example, the interview schedule may be set according to the time slots when the candidate makes an onsite visit to the organization. The qualified interviewers can be those whose match scores for one or more aspects indicate that they are qualified to evaluate and validate these aspects during an interview. In one implementation, processing device 102 may determine the qualified interviewers according certain rules such as, for example, assign a certain number (e.g., five) of top ranked potential interviewers for each aspect as qualified interviewers. Further, processing device 102 may determine the availabilities of these qualified interviewers. Processing device 102 may access the public calendar of these qualified interviewers to determine their availabilities in view of the interview schedule. In one implementation, processing device 102 may eliminate those qualified interviewers that are not available during any time slots of the interview schedule, and place those qualified interviewers that are available for at least one or at least partial one time slot of the interview schedule in the pool of interviewers for selection.

At 504, processing device 102 may further select the interviewers and optionally back-up interviewers for the one or more aspects based on rules. In one implementation, the rules may take into consideration both the match scores associated with each qualified interviewer with respect to an aspect and the availability of the qualified interviewer. For example, the rules may associate each time slot in the interview schedule with one or more aspects, determine qualified interviewers pertaining to the one or more aspects, and then assign one or more qualified interviewers available for the time slot and with the high combined match scores with respect to the one or more aspects to the time slot.

In one implementation, the rules can be configured to account for internal hierarchy of the organization. For example, one rule may provide that at least one peer of the role is included as an interviewer. The ranking of the match scores can be then tailored to the peer population for the peer interviewer slot. Another rule may provide that all interviewers may have an equal or more numbers of years of experiences than the candidate. Yet another rule may provide that the interviewers include at least one female and at least one male, and the female-to-male interviewers ratio needs be balanced. A machine-learning classifier trained and executed on the same processor can be utilized to identify female and male pools of interviewers and the relative ranking of matching scores within the pool. Beyond the female-to-male ratio, other diversity classes may be accounted for including race. Other categories to enhance the configurability of the rules include the schools that the candidate went to, or similar schools, and military experience, if any, of the candidate.

In one implementation, the rules may take into consideration qualified interviewers who are available for only a portion of a time slot. For example, a qualified interviewer may be available only 20 minutes for a 30 minute time slot based on his calendar. Instead of eliminating the qualified interviewer altogether, the rule may calculate a time weighted match score. For example, the time weighted match score can be calculated as $MS'=(T_{avail}/T_{total})*MS$, where $T_{avail}$ is the partial time available, $T_{total}$ is the total time for the time slot, MS is the match score, and MS' is the time weighted match score. When $T_{avail}$ is the same as $T_{total}$ MS'=MS. Using the time weighted match scores, qualified interviewers with partial availability may also be considered for the interview. Alternatively, the processing device may assign the partially available qualified interviewer with other qualified interviewers to conduct group interview.

Additionally, processing device 102 may further select one or more back-up qualified interviewers for each of the selected qualified interviewers. The back-up qualified interviewers may be similarly selected based on rules taking into consideration both the match scores and availability for each time slot. The back-up qualified interviewers may substitute in the event that the selected qualified interviewer declines the interview task or becomes unavailable due to conflicts.

At 506, the processing device 102 may generate interview sheets personalized for each selected interviewer and notify the selected interviewer with the interview sheet. An interview sheet is a document prepared to help the interviewer conduct the interview. The document may include information about the candidate (e.g., the candidate's resume), and the time and location of the interview. Implementations may further personalize the interview sheet for each interviewer with customized questions. In one implementation, the processing device 102 may generate interview questions for evaluating the one or more aspects assigned to the interviewer for evaluating and validating during the interview. The questions may be selected from a question bank that stores questions linked to different aspects using a relationship map. Alternatively, the questions may be generated online based on the one or more aspect to be evaluated and validated. Responsive to determining the questions relating to the one or more aspects, the processing device 102 may add the questions to the interview sheet to create a personalized interview sheet for the interviewer, and then generate a transmittal including the personalized interview sheet to the interviewer, inviting the interviewer to participate in the interview of the candidate.

After the interviews, the personalized interview sheets can be gathered and fed back into an evaluation module 120 as shown in FIG. 1, where the candidate is rated on the likelihood of success at the organization or likelihood of advancing to the next stage of the hiring process or both. The likelihood scores are measured through inference results of a machine learning module trained on past interviewees and hires at the organization and similar hires for similar titles at other companies. Based on the likelihood scores, the candidate may be recommended through a user interface to advance to the next stage or be rejected at the current stage, or may be automatically advanced or rejected based on thresholding.

Interviewers may develop associated additional data dimensionalities as they interview more and more candidates. Each interviewer may be rated by the candidate. The ratings may then be incorporated in evaluating qualified interviewers, the matching score calculation, or as part of filtering rules for future selection of interviewers for a future candidate.

Figure 6:
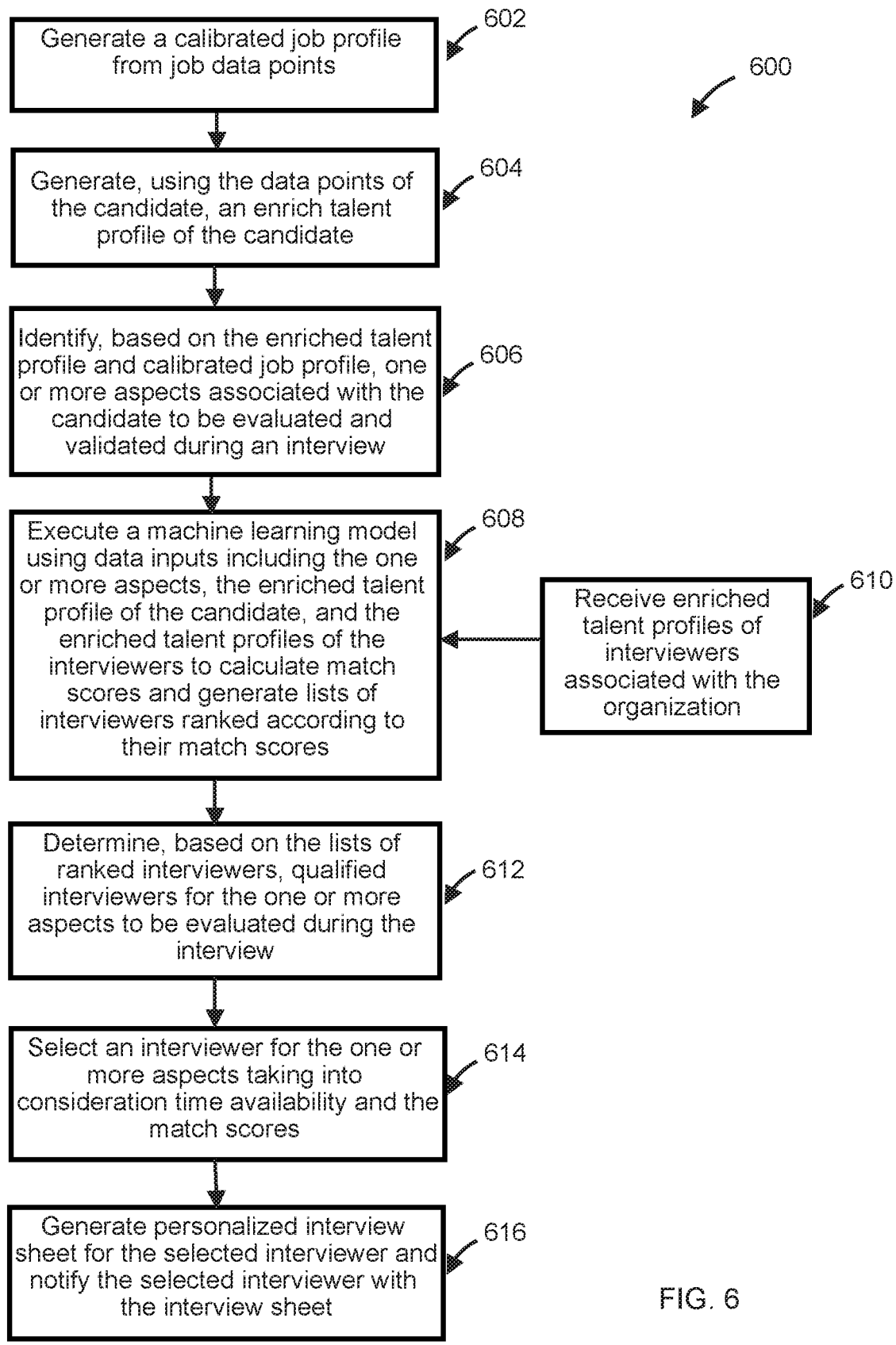
FIG. 6 illustrates a flowchart of a method to identify interviewers for interviewing a candidate according to an implementation of the disclosure.

FIG. 6 illustrates a flowchart of a method 600 to identify interviewers for interviewing a candidate according to an implementation of the disclosure. Method 600 may be performed by processing devices that may comprise hardware (e.g., circuitry, dedicated logic), computer readable instructions (e.g., run on a general purpose computer system or a dedicated machine), or a combination of both. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by a processing device 102 executing intelligent scheduler 106 as shown in FIG. 1.

As shown in FIG. 6, processing device 102 may identify a candidate to be interviewed for a job opening with an organization. For example, the candidate may be identified by his/her name entered by an interview coordinator using a user interface into the intelligent scheduler system. At 602, processing device 102 may generate a calibrated job profile based job data points. The calibrated job profiles may include information from a job description and additional information. The information from the job description may include public information such as, for example, the job title; responsibilities of the job; education, training, and certifications required for the job; skills required or preferred to perform the job; prior working experience. The additional information profiles of qualified candidates previously hired for a same or similar position within the organization. The calibrated job profile may provide more information than that in the job description.

Responsive to identifying the candidate for the interview, processing device 102 may receive candidate data points containing information relating to the candidate. The candidate data points may include the candidate's resume submitted to the organization and other information publicly available to the organization.

At 604, processing device 102 may use the candidate data points to generate an enriched talent profile of the candidate. As discussed above, the enriched talent profile may include both the profile of the candidate (e.g., the resume) available at the organization and supplemental data collected from other sources. The content of the enriched talent profile of the candidate may include variables such as the name; the contact information; past roles and jobs; skills; employers as well as responsibilities and duration of these employments; a training history; an education history including schools, fields of study, grade point average (GPA), rankings, and degrees; personal web pages/blogs/video postings, social network pages (e.g., LinkedIn and or Facebook pages); professional work products (e.g., technical publications, open source software contributions); patents; professional references; awards etc. Each category may be represented using a string of words (including numerical values). The value of a variable may be encoded using a vector representation whose values can be words or numerical values.

At 606, processing device may extract, from the enriched talent profile of the candidate and the calibrated job profile, one or more aspects that need to be evaluated and validated during the interview. For example, the aspects can be technical skills, where different aspects may require interviewers with different knowledge sets to conduct the interview. Additionally, at 610, processing device 102 may receive enriched talent profiles of potential interviewers associated with the organization. The potential interviewers can be employees or contractors associated with the organization. The intelligent scheduler system may select qualified interviewers from the pool of potential interviewers. These enriched talent profiles of potential interviewers may have been calculated offline in advance because the employees and contractors may have known in advance At 608, processing device 102 may execute a machine learning model to calculate a match score for each potential interviewer with respect to an aspect. The data inputs to the machine learning model may include the one or more aspects to be evaluated, the enriched talent profile of the candidate, and the enriched talent profiles of the interviewers. The machine learning model can be a DNN or other types of neural networks that had previously trained based on training data as discussed above. For each aspect, processing device 102 may execute, based on the data inputs, the machine learning model to calculate a respective match score for each potential interviewer in the pool, and create a list of ranked potential interviewers based on their match scores. Further, processing device 102 may proceed to calculate a corresponding list for each aspect (or a group of similar aspects).

At 612, processing device 102 may determine qualified interviewers for each aspect based on the corresponding list of ranked potential interviewers. The qualified interviewers for an aspect are those determined to be suitable to evaluate and validate the aspect. Alternatively, for efficiency, processing device 102 may determine qualified interviewers for a group of similar aspects.

At 614, processing device 102 may retrieve available times from the calendar of the qualified interviewers, and select an interviewer to evaluate and validate the one or more aspects based on rules. The selection of the interviewer may take into consideration time slots in the interview agenda, the availabilities of the potential interviewers, and their corresponding match scores. In one implementation, processing device 102 may assign the interviewer with the highest match score as the selected interviewer to a time slot. In another implementation, processing device 102 may calculate a time weighted match score to take into consideration of partial availability and select the one having the highest time weighted match score. In another implementation, processing device 102 may determine a best combination of interviewers for a group interview to determine more than one aspects of the candidate.

At 616, processing device 102 may generate a personalized interview sheet for the selected interviewer. The personalized interviewer sheet may include the interviewer information, the time and location of the interview, and further questions relating to the one more aspects assigned to the interviewer. The questions in the interview sheet may assist the interviewer to evaluate and validate the one or more aspects of the candidate. Processing device 102 may send a transmittal to invite the selected interviewer to the interview.

Implementations may also provide a graphic user interface that provides one or more views. In one implementation, the one or more views may include an aspect view including panels, each panel being associated with one or more aspects that are to be evaluated and validated during the interview and an interviewer selected by the intelligent scheduler assigned to evaluate and validate the one or more aspects. Aspects may include different skills or personalities to be evaluated and validated. Each panel may be expanded to drill into details about the one or more aspects and the assigned interviewer.

In one implementation, the one or more views may include a time view. The time view may include suggested times and specific times. The time template may include a first view showing a date and times of the date associated with each interviewer, and a second calendar view showing the arrangement for a specific date. The intelligent scheduler may assign potential interviewers to interview time slots based on the availabilities of the potential interviewers during the time slots. To this end, the intelligent scheduler may perform conflict management by looking into the calendar of each potential interviewers and determining an interview agenda by matching the time slots with interviewers based on time conflict management rules.

In one implementation, the one or more views may include an alternative interviewer view. The alternative interviewer view may include back-up interviewers and their time availabilities determined by the intelligent scheduler. When a scheduled interviewer becomes unavailable due to cancellation, implementations may provide an "options" associated with the unavailable interviewer where the options may include "find alternative interviewers," "remove the unavailable interviewer," and "schedule an alternative interviewer" options to allow an interview organizer to make the action.

Figure 7:
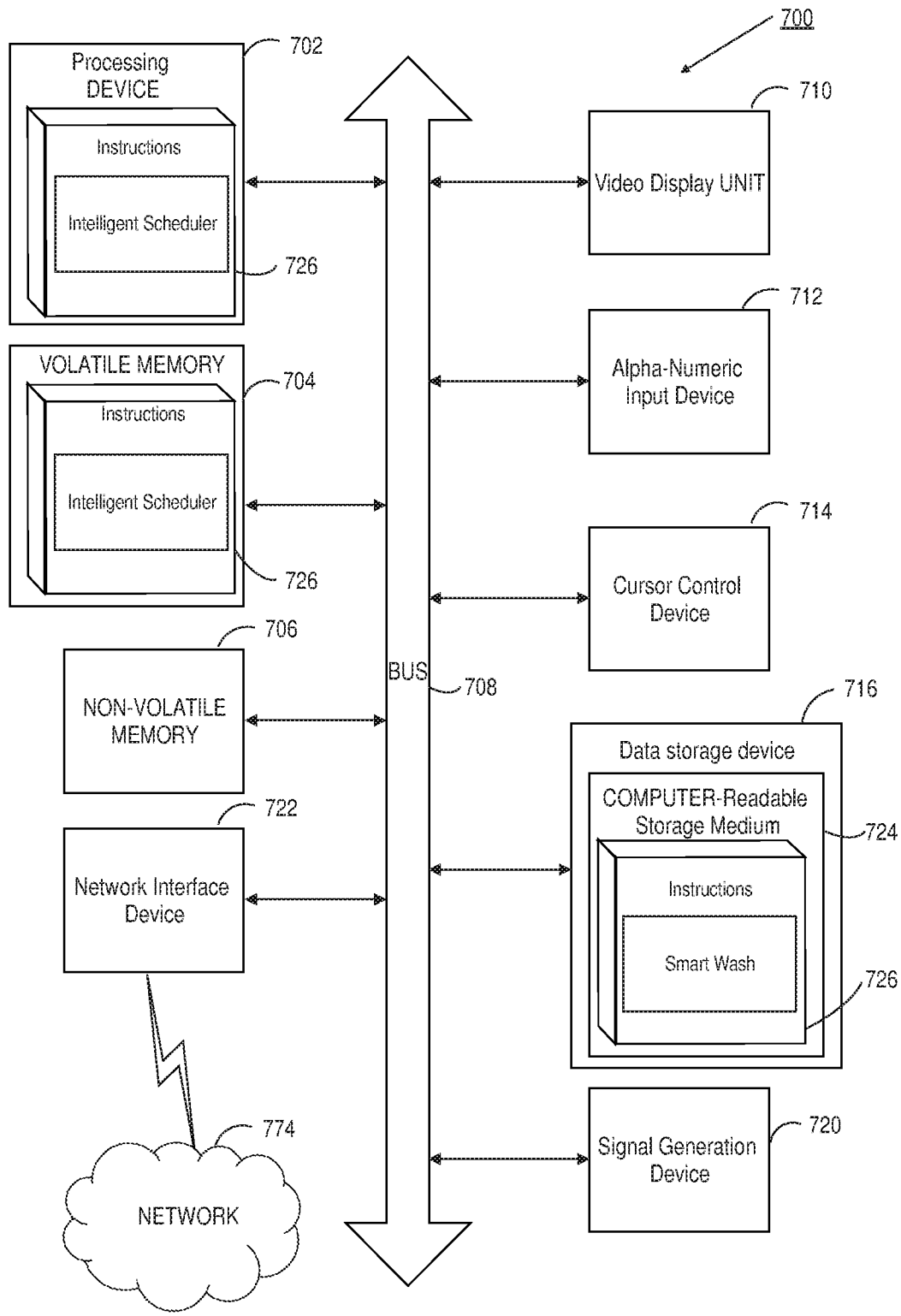
FIG. 7 depicts a block diagram of a computer system operating in accordance with one or more aspects of the present disclosure.

FIG. 7 depicts a block diagram of a computer system operating in accordance with one or more aspects of the present disclosure. In various illustrative examples, computer system 700 may correspond to the processing device 102 of FIG. 1.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions of the intelligent scheduler 106 of FIG. 1 for implementing method 600.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. An intelligent scheduler system implemented by one or more computers to automate selection of qualified interviewers for an interview of a candidate for a job opening at an organization, the one or more computers comprising:
   a storage device; and
   a processing device, communicatively connected to the storage device, to:
      obtain first data points associated with the job opening from a first plurality of sources, and generate, based on the first data points, a calibrated job profile wherein the calibrated job profile further comprises vector representations of variables derived from a profile of a qualified candidate previously hired for a same or similar position within the organization or predicted based on candidates previously hired for a same or similar position within the organization;
      obtain second data points associated with the candidate from a second plurality of sources, and generate, based on the second data points, an enriched talent profile of the candidate;
      identify, by comparing the calibrated job profile and the enriched talent profile, one or more aspects of the candidate to be evaluated during the interview;
      receive enriched talent profiles of potential interviewers of the organization;
      execute a neural network module using, as the inputs, the one or more aspects, the enriched talent profile of the candidate, and the enriched talent profiles of the potential interviewers to calculate, as outputs, plurality of ranked lists, the neural network module comprising an input layer to receive the inputs and an output layer to output the plurality of ranked lists that each contains one or more potential interviewers that are ranked according to match scores indicating an effectiveness measure of a corresponding one of the one or more potential interviewers for evaluating a corresponding aspect of the candidate during the interview, wherein parameters of the neural network module are adjusted using an iterative training in one or more training sessions using training data including enriched talent profiles of example qualified interviewers, and wherein the iterative training of the neural network module iteratively includes: calculating using the neural network, in a forward propagation, predicted ranked lists that are ranked according to match scores indicating the effectiveness measure of a corresponding example interviewer for evaluating training aspect of example candidate, calculating a difference value between the predicted ranked lists and target ranked lists in a backward propagation, and adjusting one or more parameters of the neural network module based on the difference value between the predicted ranked lists and the target ranked lists;

determine, based on time slots in an interview agenda and calendars of the qualified interviewers, availabilities of interviewers during the interview, wherein the availabilities of the interviewers comprise part time availability for being available less than one time slot;

determine, based on the plurality of ranked lists and rules, qualified interviewers from the potential interviewers for evaluating each of the one or more aspects during the interview, wherein the rules comprise taking account of match scores for interviewers that are available and time weighted match scores for interviewers that are part time available, and wherein a time weighted match score is calculated based on a percentage of available time over a time slot that is weighted over a match score associated with an interviewer; and transmit a request for participating in an interview of the candidate to at least one of the qualified interviewers.

2. The intelligent scheduler system of claim 1, wherein the processing device is further to:
select, based on the match scores and the availabilities of the qualified interviewers, one or more interviewers to evaluate the aspect during the interview.

3. The intelligent scheduler system of claim 2, wherein the processing device is further to:
generate an interview sheet personalized for the selected one or more interviewers; and
send a request comprising the personalized interview sheet to the selected one or more interviewers.

4. The intelligent scheduler system of claim 1, wherein the data points associated with the job opening comprise a job description and additional information relating to the job opening, and wherein the calibrated job profile comprises vector representations of variables comprising at least one of a job title, responsibilities of the job, pre-requisite education, pre-requisite training, pre-requisite certifications, skills required for the job, skills preferred for the job, or working experience.

5. The intelligent scheduler system of claim 1, wherein the data points associated with the candidate comprise a profile of the candidate and supplemental data, and wherein the enriched talent profile of the candidate comprises vector representations of variables comprising at least one of skills, past employments, responsibilities and duration of these employments, a training history, an education history, personal web pages/blogs/video postings, social network pages, or professional work products.

6. The intelligent scheduler system of claim 5, wherein the enriched talent profile of the candidate further comprises vector representations of variables comprising at least one of predicted future job titles, predicted future employers, predicted future seniority levels, predicted future skills to acquire, or predicted tenure duration with the organization.

7. The intelligent scheduler system of claim 1, wherein each of the enriched talent profiles of potential interviewers of the organization comprises vector representations of variables comprising at least one of skills, past employments, responsibilities and duration of these employments, a training history, an education history, personal web pages/blogs/video postings, social network pages, or professional work products.

8. The intelligent scheduler system of claim 1, wherein the aspect comprises at least one of a job skill or a personal trait of the candidate, and wherein the gender diversity factor comprises a female-to-male ratio.

9. The intelligent scheduler system of claim 1, wherein the neurons of the hidden layers of the deep neural network perform one of linear computation or non-linear computation specified by parameters, and wherein the parameters are determined in a training process.

10. The intelligent scheduler system of claim 2, wherein the processing device is further to:
select, based on the plurality of ranked lists and the availabilities of the qualified interviewers, one or more back-up interviewers; and
responsive to a request for substitution for the selected interviewers, present the one or more back-up interviewers on a user interface.

11. The intelligent scheduler system of claim 3, wherein the processing device is further to:
identify questions relating to the aspect from a question bank; and
add the identified interview questions to the personalized interview sheet.

12. A method to automate selection of qualified interviewers for an interview of a candidate for a job opening at an organization, the method comprising:
obtaining, by a processing device, first data points associated with the job opening from a first plurality of sources, and generating, based on the first data points, a calibrated job profile, wherein the calibrated job profile further comprises vector representations of variables derived from a profile of a qualified candidate previously hired for a same or similar position within the organization or predicted based on candidates previously hired for a same or similar position within the organization;
obtaining, by the processing device, second data points associated with the candidate from a second plurality of sources, and generating, based on the second data points, an enriched talent profile of the candidate;
identifying, by the processing device by comparing the calibrated job profile and the enriched talent profile, one or more aspects of the candidate to be evaluated during the interview;
receiving, by the processing device, enriched talent profiles of potential interviewers of the organization;
executing, by the processing device, a neural network module using, as inputs, the one or more aspects, the enriched talent profile of the candidate, and the enriched talent profiles of the potential interviewers to calculate, as outputs, plurality of ranked lists, the neural network module comprising an input layer to receive inputs and an output layer to output the plurality of ranked lists that each contains one or more potential interviewers that are ranked according to match scores indicating an effectiveness measure of a corresponding one of the one or more potential interviewers for evaluating a corresponding aspect of the candidate during the interview, wherein parameters of the neural network module are adjusted using an iterative training in one or more training sessions using training data including enriched talent profiles of example qualified interviewers, and wherein the iterative training of the neural network module iteratively includes: calculating using the neural network, in a forward propagation, predicted ranked lists that are ranked according to match scores indicating the effectiveness measure of a corresponding example interviewer for evaluating training aspect of example candidate, calculating a difference value between the predicted ranked lists and target ranked lists in a backward propagation, and adjusting one or more parameters of the neural network module based on the difference value between the predicted ranked lists and the target ranked lists;

determining, based on time slots in an interview agenda and calendars of the qualified interviewers, availabilities of interviewers during the interview, wherein the availabilities of the interviewers comprise part time availability for being available less than one time slot;

determining, by the processing device based on plurality of ranked lists and rules, qualified interviewers from the potential interviewers for evaluating each of the one or more aspects during the interview, wherein the rules comprise taking account of match scores for interviewers that are available and time weighted match scores for interviewers that are part time available, and wherein a time weighted match score is calculated based on a percentage of available time over a time slot that is weighted over a match score associated with an interviewer; and transmitting a request for participating in an interview of the candidate to at least one of the qualified interviewers.

13. The method of claim 12, further comprising:
selecting, based on the match scores and the availabilities of the qualified interviewers, one or more interviewers to evaluate the aspect during the interview.

14. The method of claim 13, further comprising:
generating an interview sheet personalized for the selected one or more interviewers; and
sending a request comprising the personalized interview sheet to the selected one or more interviewers.

15. The method of claim 12, wherein the calibrated job profile comprises vector representations of variables comprising at least one of a job title, responsibilities of the job, pre-requisite education, pre-requisite training, pre-requisite certifications, skills required for the job, skills preferred for the job, working experience.

16. The method of claim 12, wherein the enriched talent profile of the candidate comprises vector representations of variables comprising at least one of skills, past employments, responsibilities and duration of these employments, a training history, an education history, personal web pages/blogs/video postings, social network pages, or professional work products, and wherein the enriched talent profile of the candidate further comprises vector representations of variables comprising at least one of predicted future job titles, predicted future employers, predicted future seniority levels, predicted future skills to acquire, or predicted tenure duration with the organization.

17. The method of claim 12, wherein the aspect comprises at least one of a job skill or a personal trait of the candidate, and wherein the gender diversity factor comprises a female-to-male ratio.

18. The method of claim 14, further comprising:
identifying questions relating to the aspect from a question bank; and
adding the identified interview questions to the personalized interview sheet.

19. A machine-readable non-transitory storage media encoded with instructions that, when executed by one or more computers, cause the one or more computers to implement an intelligent scheduler system to automate selection of qualified interviewers for an interview of a candidate for a job opening at an organization, the one or more computers comprising:

a storage device; and
a processing device, communicatively connected to the storage device, to:
obtain first data points associated with the job opening from a first plurality of sources, and generate, based on the first data points, a calibrated job profile, wherein the calibrated job profile further comprises vector representations of variables derived from a profile of a qualified candidate previously hired for a same or similar position within the organization or predicted based on candidates previously hired for a same or similar position within the organization;

obtain second data points associated with the candidate from a second plurality of sources, and generate, based on the second data points, an enriched talent profile of the candidate;

identify, by comparing the calibrated job profile and the enriched talent profile, one or more aspects of the candidate to be evaluated during the interview;

receive enriched talent profiles of potential interviewers of the organization;

execute a neural network module using, as inputs, the one or more aspects, the enriched talent profile of the candidate, and the enriched talent profiles of the potential interviewers to calculate, as outputs, plurality of ranked lists, the neural network module comprising an input layer to receive the inputs and an output layer to output the plurality of ranked lists that each contains one or more potential interviewers that are ranked according to match scores indicating an effectiveness measure of a corresponding one of the one or more potential interviewers for evaluating a corresponding aspect of the candidate during the interview, wherein parameters of the neural network module are adjusted using an iterative training in one or more training sessions using training data including enriched talent profiles of example qualified interviewers, and wherein the iterative training of the neural network module iteratively includes: calculating using the neural network, in a forward propagation, predicted ranked lists that are ranked according to match scores indicating the effectiveness measure of a corresponding example interviewer for evaluating training aspect of example candidate, calculating a difference value between the predicted ranked lists and target ranked lists in a backward propagation, and adjusting one or more parameters of the neural network module based on the difference value between the predicted ranked lists and the target ranked lists;

determine, based on time slots in an interview agenda and calendars of the qualified interviewers, availabilities of interviewers during the interview, wherein the availabilities of the interviewers comprise part time availability for being available less than one time slot;

determine, based on the plurality of ranked lists and rules, qualified interviewers from the potential interviewers for evaluating each of the one or more aspects during the interview, wherein the rules comprise taking account of match scores for interviewers that are available and time weighted match scores for interviewers that are part time available, and wherein a time weighted match score is calculated based on a percentage of available time over a time slot that is weighted over a match score associated with an interviewer; and transmit a request for participating in an interview of the candidate to at least one of the qualified interviewers.

* * * * *